(12) United States Patent
Joos et al.

(10) Patent No.: US 9,187,364 B2
(45) Date of Patent: Nov. 17, 2015

(54) METHOD OF GLASS EDGE COATING (71) Applicant: Corning Incorporated, Corning, NY (US)

(72) Inventors: Felipe Miguel Joos, Addison, NY (US); Gregory William Keyes, Rochester, NY (US); Hideki Masaki, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/185,101

(22) Filed: Feb. 20, 2014

(65) Prior Publication Data
US 2014/0242291 A1    Aug. 28, 2014

Related U.S. Application Data (60) Provisional application No. 61/770,382, filed on Feb. 28, 2013.

(51) Int. Cl.
| C03C 17/00 | (2006.01) |
| C03C 17/32 | (2006.01) |
| B05C 5/02 | (2006.01) |
| B05C 11/10 | (2006.01) |

(52) U.S. Cl.
CPC ............. *C03C 17/001* (2013.01); *B05C 5/0216* (2013.01); *B05C 5/0291* (2013.01); *C03C 17/002* (2013.01); *C03C 17/32* (2013.01); *B05C 11/1034* (2013.01); *C03C 2218/112* (2013.01)

(58) Field of Classification Search
CPC ............... C03C 17/28–17/328; C03C 17/001; B05C 5/0204
USPC .......................... 427/168, 284, 165
See application file for complete search history.

(56) References Cited

U.S. PATENT DOCUMENTS

| 6,120,908 A | 9/2000 | Papanu et al. ................. 428/429 |
| 7,939,125 B2 | 5/2011 | Abernathy et al. ............... 427/8 |
| 8,257,779 B2 | 9/2012 | Abernathy et al. ............... 427/8 |
| 2007/0145164 A1* | 6/2007 | Ahmadi et al. ............... 239/583 |
| 2009/0201485 A1* | 8/2009 | Van Der Heijden et al. ... 355/77 |
| 2010/0221501 A1 | 9/2010 | Chen et al. .................... 428/194 |
| 2010/0285260 A1 | 11/2010 | Bookbinder et al. .......... 428/45 |
| 2010/0285277 A1 | 11/2010 | Edwards et al. .............. 428/157 |

(Continued)

OTHER PUBLICATIONS

Alec J. Babiarz; "Jetting Small Dots of High Viscosity Fluids for Packaging Applications"; Semiconductor International; Aug. 2006; pp. 1-6.

(Continued)

*Primary Examiner* — Elizabeth Burkhart
(74) *Attorney, Agent, or Firm* — John T. Haran (57) ABSTRACT A method of glass edge coating includes supplying a coating material to a jetting dispenser. Droplets are jetted from a nozzle of the jetting dispenser. Beads of coating material are deposited on a perimeter edge of the glass article by arranging for the droplets to drop on the perimeter edge after falling through a standoff distance between the nozzle and the perimeter edge, whereafter each bead flows in a plurality of directions on the perimeter edge, thereby forming a coating on the perimeter edge. During the jetting, a relative motion is effected between the nozzle and the perimeter edge such that the beads are deposited at a plurality of locations along the perimeter edge.

18 Claims, 8 Drawing Sheets

(56) References Cited

U.S. PATENT DOCUMENTS

2012/0040146 A1* 2/2012 Garner et al. ............... 428/192
2014/0035995 A1* 2/2014 Chou et al. ................. 347/20

OTHER PUBLICATIONS

M. Szuch, et al., "*Breadth of Dispensing Technologies Offers a Wide Variety of Conformal Coating Processing Capabilities*", Asymtek Headquarters, IMAPS SoCal, CA, May 2004, pp. 1-13.

M. Szuch, et al., "New Coating Technologies and Advanced Techniques in Conformal Coating", Asymtek, A Nordson Company, Carlsbad, CA, pp. 1-6.

Patent Cooperation Treaty International Notification of Transmittal of the International Search Report and The Written Opinion of the International Searching Authority, international application No. PCT/US2014/017965: mailing date Jul. 17, 2014, 10 pages.

\* cited by examiner

METHOD OF GLASS EDGE COATING

This application claims the benefit of priority under 35 U.S.C. §119 of U.S. Provisional Application Ser. No. 61/770,382 filed on Feb. 28, 2013, the content of which is relied upon and incorporated herein by reference in its entirety.

FIELD

The field relates to strengthening of glass substrates.

BACKGROUND

U.S. Pat. No. 6,120,908 issued to Papanu et al. ("the '908 patent") describes a method of strengthening or restoring strength to flat glass that has been weakened by surface flaws, such as when the glass is cut by scoring and breaking, by coating the glass edges with a strengthening composition. The '908 patent discloses that particularly useful strengthening compositions are aqueous solutions containing silane-based compositions, especially polymerized cross-linked siloxane. The '908 patent further discloses that the strengthening compositions can be applied by spraying, dripping, dipping, painting, or any other techniques suited to the application of liquids, vapors, or aerosols, with painting or brushing being preferred.

U.S. Patent Application Publication No. 2012/040146 describes preserving the high bend strength of a thin glass substrate by coating the edges of the glass substrate with a polymeric material with coating thickness in a range from 5 μm to about 50 μm using methods such as dipping, painting, spraying, dispensing from a die, or the like.

U.S. Patent Application Publication No. 2010/0285260 to Bookbinder et al. describes a method of strengthening glass edges by over-molding the glass edges with a polymer using processes such as injection molding.

U.S. Patent Application Publication No. 2010/0285277 to Edwards et al. describes a method of strengthening glass edges by bonding a metallic material to the glass edges.

U.S. Patent Application Publication No. 2010/0221501 to Chen et al. describes a method of strengthening glass edges by bonding a shaped fiber to the glass edges.

SUMMARY

There is a desire for a method of strengthening glass edges that is not labor intensive, that can be automated, that is relatively low cost, and that will not render the glass surfaces undesirable from aesthetic and tactile viewpoints.

In one illustrative embodiment, a method of glass edge coating includes supplying a coating material to a jetting dispenser. The method further includes jetting a plurality of droplets from a nozzle of the jetting dispenser. The method includes depositing beads of coating material on a perimeter edge of a glass article by arranging for the droplets to drop on the perimeter edge after falling through a standoff distance between the nozzle and the perimeter edge, whereafter each bead flows in a plurality of directions on the perimeter edge, thereby forming a coating on the perimeter edge. The method further includes effecting a relative motion between the nozzle and the perimeter edge during the jetting such that the beads are deposited at a plurality of locations along the perimeter edge.

Possible advantages of the method include flexibility and scalability. A variety of glass article sizes, thicknesses, and perimeter shapes can be handled by the method. The method can use glass shape and coating data acquired before and after coating steps to improve subsequent coating of glass articles. The jetting of droplets can be done in a vertical or horizontal orientation, with either or both of the dispenser and glass article being translated to effect the relative motion between the nozzle and the perimeter edge. Non-contact dispensing of droplets will eliminate the chance of inducing or creating new flaws in the perimeter edge. The dispensing speed can be very fast, e.g., over 200 mm/s, which would enable mass production.

Jetting allows for dispensing a very precise amount of material needed to coat the perimeter edge, which would allow coating of the perimeter edge with minimal to no overflow to the glass surfaces. The method allows for coating of indentations, protrusions, and other features in the perimeter edge. The method enables coating of corners in the perimeter edge with small radius of curvature, e.g., less than 5 mm, without requiring complex motion control of the dispenser and/or glass article. The jetting can occur at a relatively large standoff between the nozzle and perimeter edge, which makes the coating process less sensitive to glass dimensional variations, which can be as much as ±0.1 mm.

The illustrative embodiments described above are intended to provide an introduction to the disclosure. They are not intended to identify key or critical elements or to delineate the scope of the disclosure or appended claims. Various embodiments will be described in greater detail below with reference to the accompanying drawings.

BRIEF DESCRIPTION OF DRAWINGS

The following is a description of the figures in the accompanying drawings. The figures are not necessarily to scale, and certain features and certain views of the figures may be shown exaggerated in scale or in schematic in the interest of clarity and conciseness.

DESCRIPTION OF EMBODIMENTS

In the following detailed description, numerous specific details may be set forth in order to provide a thorough understanding of embodiments of the invention. However, it will be clear to one skilled in the art when various embodiments described herein may be practiced without some or all of these specific details. In other instances, well-known features or processes may not be described in detail so as not to unnecessarily obscure aspects of the disclosure. In addition, like or identical reference numerals may be used to identify common or similar elements.

Figure 1A:
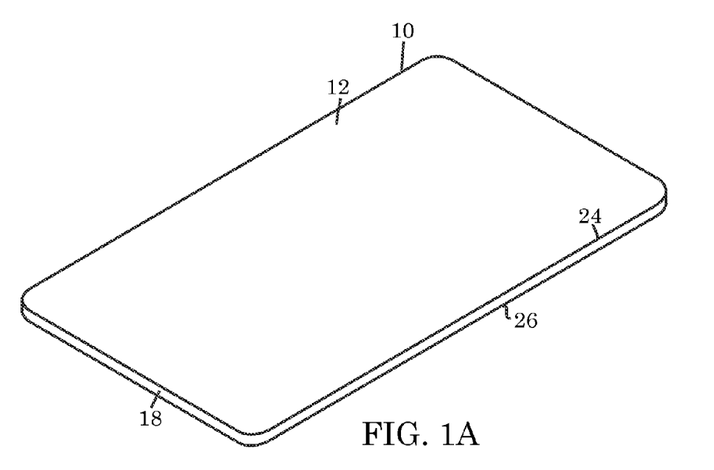
FIG. 1A is a perspective view of a glass article.
Figure 1B:
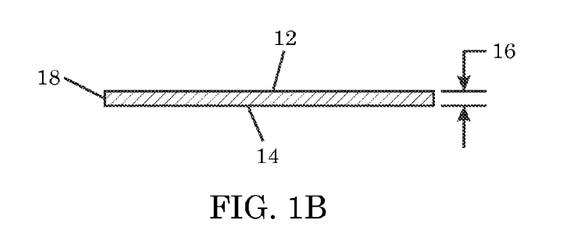
FIG. 1B is a cross-section of the glass article of FIG. 1A.
Figure 1C:
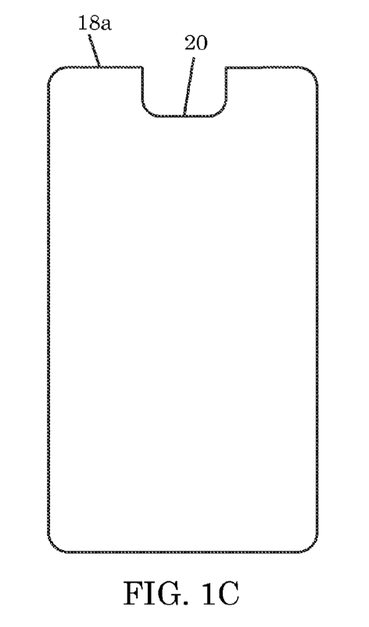
FIG. 1C shows a perimeter edge with an indentation.
Figure 1D:
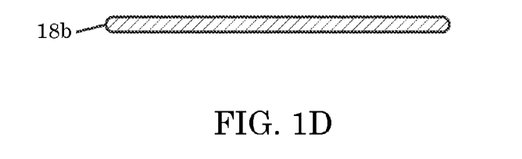
FIG. 1D shows a perimeter edge with a bull-nose profile.
Figure 1E:
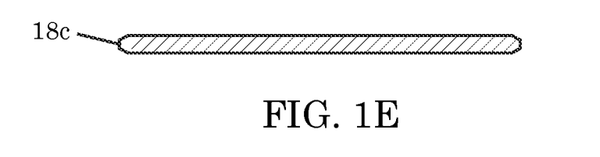
FIG. 1E shows a perimeter edge with a chamfered profile.

FIGS. 1A and 1B show a glass article 10 having opposing surfaces 12, 14 separated by a thickness of glass 16 and bounded by a perimeter edge 18. The term "perimeter edge" is intended to refer to the entire edge along the perimeter of the glass article. The glass article 10 may have any suitable perimeter shape. For example, as shown in FIG. 1A, the glass article 10 has a rectangular perimeter shape with rounded corners, or a rounded-rectangular perimeter shape. Features, such as indentations and protrusions, may be formed on the perimeter edge 18. For example, FIG. 1C shows an indentation 20 formed in a perimeter edge 18a. The perimeter edge of the glass article 10 may have any suitable profile, e.g., flat (18 in FIG. 1B), bull-nosed (18b in FIG. 1D), chamfered (18c in FIG. 1E), and the like.

Typically, the opposing surfaces 12, 14 will be flat. Alternatively, the opposing surfaces 12, 14 may be curved. If the opposing surfaces 12, 14 are flat or slightly curved, the glass article 10 may be referred to as a flat glass article. In some cases, the opposing surfaces 12, 14 may be formed into a three-dimensional shape, such as a dish or sled, in which case the glass article may be referred to as a shaped glass article. Typically, the thickness of glass 16 between the opposing surfaces 12, 14 will be uniform, i.e., whether the glass article is a flat glass article or a shaped glass article. In one or more embodiments, the thickness of the glass 16 will be 1.0 mm or less. In some embodiments, the thickness of the glass will be 0.7 mm or less.

In one or more embodiments, the glass article 10 is formed from a piece of glass that was obtained from a non-virgin glass sheet, i.e., a glass sheet that has been handled. In one particular example, a glass sheet is made using a suitable process for making a flat glass sheet or ribbon, such as fusion downdraw process or float glass process. Before hard contact is made with the surfaces of the glass sheet, a protective material, such as adhesive-backed paper or plastic or polymer coating, is applied to the surfaces. Subsequently, the protective material is removed, and the glass sheet is subjected to a strengthening process, such as an ion-exchange process or tempering. After the strengthening, the glass sheet is separated into smaller glass pieces using any suitable method, such as mechanical separation or laser separation. The separated edges of each glass piece are then machined to form the glass article having the desired perimeter shape and size.

The perimeter edge of a glass article prepared as described above will be largely free of the residual compressive stress achieved by the strengthening process. In brittle materials such as glass, fracture takes place initially at a flaw or microscopic crack in the glass material and rapidly spreads across the glass material. Where the perimeter edge is largely unprotected by residual compressive stress, flaws in the perimeter edge will be potential fracture sites, resulting in a glass article having an overall low fracture strength. Flaws in the perimeter edge may come, for example, from the separation and/or machining processes or subsequent handling of the glass article. In one or more embodiments, to increase or restore the fracture strength of the glass article, a coating is applied to the perimeter edge. The coating will cover the perimeter edge and thereby prevent direct contact with the perimeter edge that may result in a fracture at a critical flaw in the perimeter edge. It should be noted that a coating may be applied to a perimeter edge of a glass article even if the glass article was not prepared in the particular manner described above.

Figure 2:
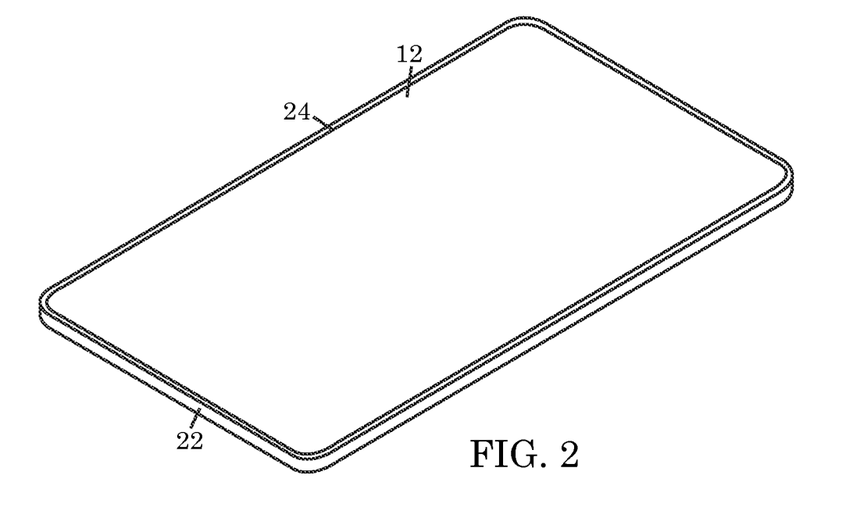
FIG. 2 shows an edge-coated glass article.

FIG. 2 shows a coating 22 applied to the glass article 10. The material of the coating 22 may be selected from UV curable polymers or other suitable edge coating material. In one or more embodiments, the coating 22 has a uniform thickness along the perimeter of the glass article 10. The thickness of the coating 22 may be in a range from 25 µm to 100 µm. In preferred embodiments, the thickness of the coating 22 may be in a range from 50 µm to 100 µm. In one or more embodiments, the coating 22 extends to the transitions 24, 26 (see 26 in FIG. 1A) between the perimeter edge 18 (see 18 in FIG. 1A) and the glass surfaces 12, 14 (see 14 in FIG. 1B). Preferably, the coating 22 does not extend beyond the transitions between the perimeter edge and the glass surfaces 12, 14 (or does not cover a portion of the glass surfaces 12, 14). However, if the coating 22 extends beyond the transitions 24, 26 (or covers a portion of the glass surfaces 12, 14), the extension (or coverage) should be minimal as to be negligible. In one or more embodiments, the coating 22 is non-apparent relative to the glass article 10. That is, the boundary between the coating and glass article should not be apparent to the naked eye from a normal viewing distance. Thus, for example, if the glass article 10 is clear, the coating 22 should also be clear. In one or more embodiments, the coating 22 is optically matched to the glass material in transmission of full or partial wavelengths. The coating 22 may also be matched to the glass material in thermal expansion. In one or more embodiments, the coating 22 is applied to the perimeter edge 18 of the glass article 10 using a non-contact dispensing method, which would avoid contact of an object with the perimeter edge 18 that could introduce new flaws to the perimeter edge.

Figure 3:
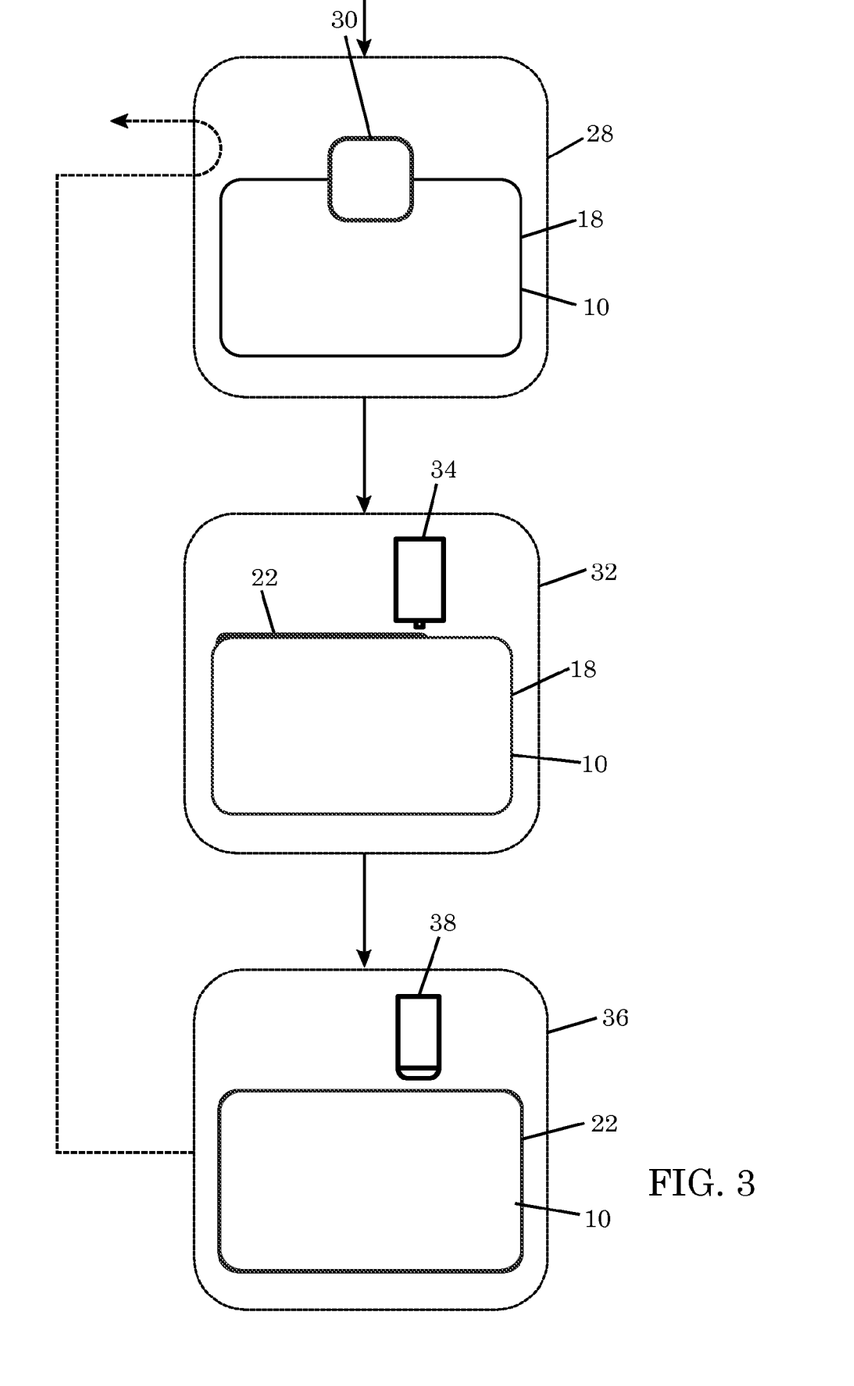
FIG. 3 illustrates a process for coating a glass article.

In one or more embodiments, as shown in FIG. 3, a process of coating the perimeter edge of the glass article 10 involves measuring the perimeter shape of the glass article 10 at a measuring station 28 using a suitable imaging system 30. The imaging system refers to a camera-based system that can capture an image that includes the perimeter edge of the glass article 10 and that can accurately decipher the perimeter edge to within 1 µm. The imaging system 30 can be translated along the perimeter of the glass article 10 to measure the perimeter shape, or the glass article 10 can be translated relative to the imaging system 30 to allow the perimeter shape to be measured. After measuring the perimeter shape, the glass article 10 is transported to a coating station 32, where a non-contact dispenser 34 is used to deposit a coating material 22 on the perimeter edge 18. The glass article 10 with the coating material 22 on the perimeter edge 18 is then transported to a curing station 36, where the coating material 22 on the perimeter edge 18 is cured using, for example, an ultraviolet radiation source 38. After curing, the glass article 10 with the edge coating 22 may be returned to the measuring station 28, where the perimeter shape of the edge-coated glass article 10 can be measured. The difference in the perimeter shape of the glass article 10 before and after the coating will indicate the thickness of the coating. The measurements can be used to determine whether the coating 22 has a uniform thickness. The measurements can also be used to adjust or calibrate the coating dispensing parameters at the station 32 for a subsequent coating process.

Figure 4A:
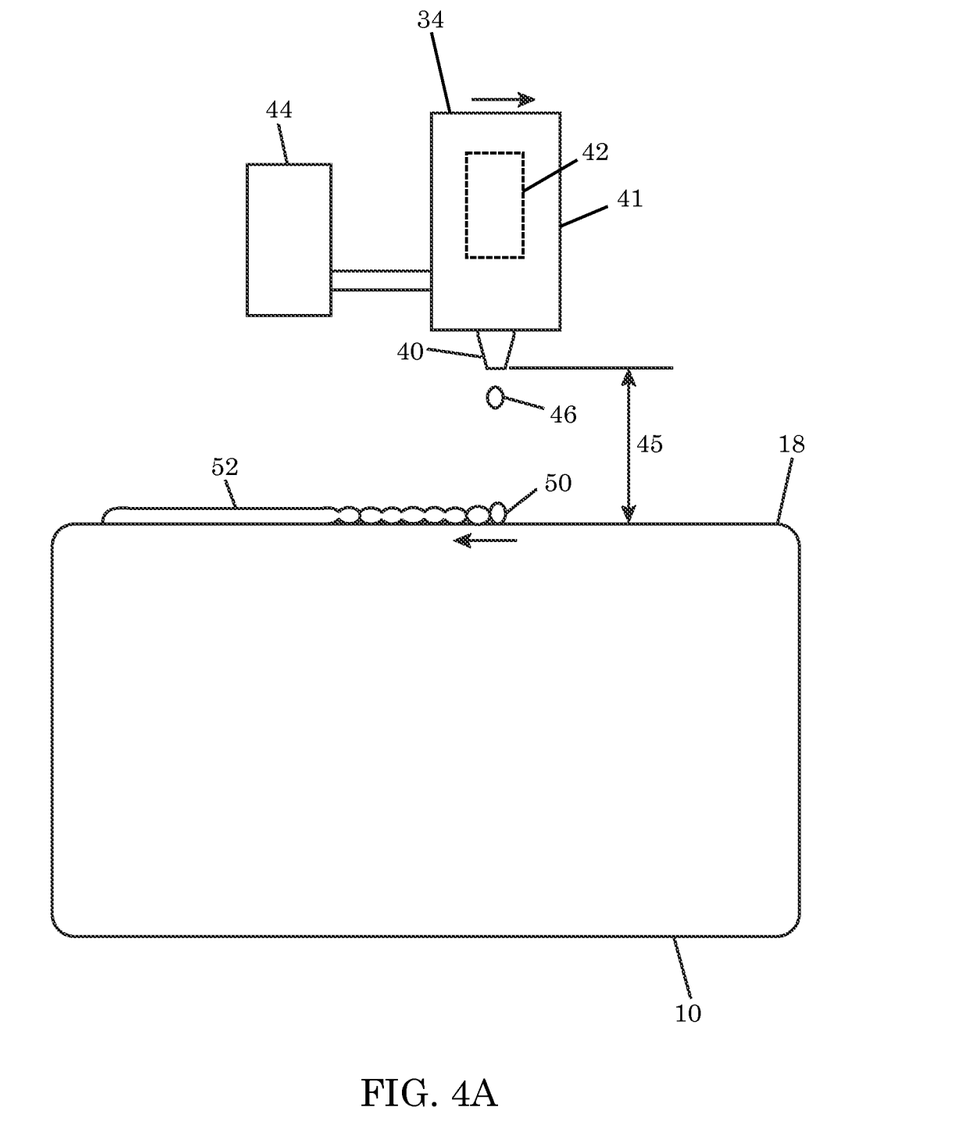
FIG. 4A illustrates a process for coating a perimeter edge by jetting.

FIG. 4A further illustrates the coating process. In one or more embodiments, the non-contact dispenser 34 is a jetting dispenser capable of jetting droplets 46 from a nozzle 40. The dispenser body 41 contains a valve 42, which may be actuated by any suitable means such as piezo-electric, thermo-electric, and pressure means. The valve 42 opens and closes to control the volume of fluid ejected through the orifice of the nozzle 40. The dispenser 34 receives coating material from a fluid supply device 44, which in some embodiments may be a syringe-type fluid supply device. Although not shown, the dispenser 34 may include heaters and the like for heating the dispenser body 41 or valve 42 such that the coating material ejected from the nozzle 40 is maintained at a particular temperature or viscosity suitable for coating the perimeter edge of the glass article with desired coating attributes. Jetting dispensers are available commercially. One preferred commercial jetting dispenser is PicoDot jet dispensing system by EFD, Inc. Jetting dispensers are also described in the patent literature, e.g., U.S. Pat. No. 8,257,779 to Abernathy et al. and US 2007/0145164 to Ahmadi et al. The jetting dispenser 34 may have any of the jetting dispenser structures known in the art for jetting material in a non-contact manner. The jetting parameters of any suitable jetting dispenser structure will need to be tailored to achieve desired edge coating attributes.

Figure 4B:
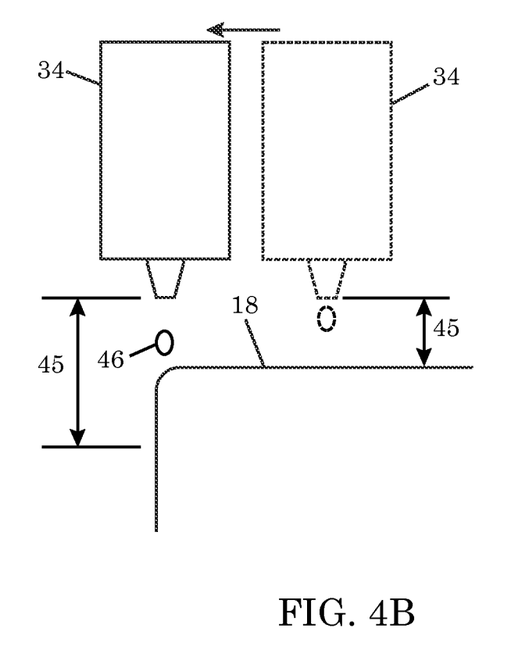
FIG. 4B shows jetting of droplets on a rounded corner of a perimeter edge with linear relative motion between the jetting nozzle and perimeter edge.
Figure 4C:
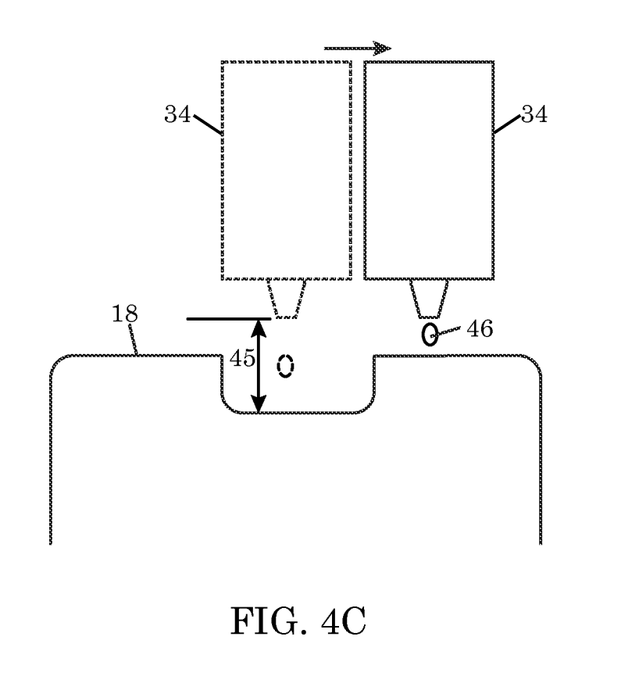
FIG. 4C shows jetting of droplets in an indentation in a perimeter edge with linear relative motion between the jetting nozzle and perimeter edge.
Figure 4D:
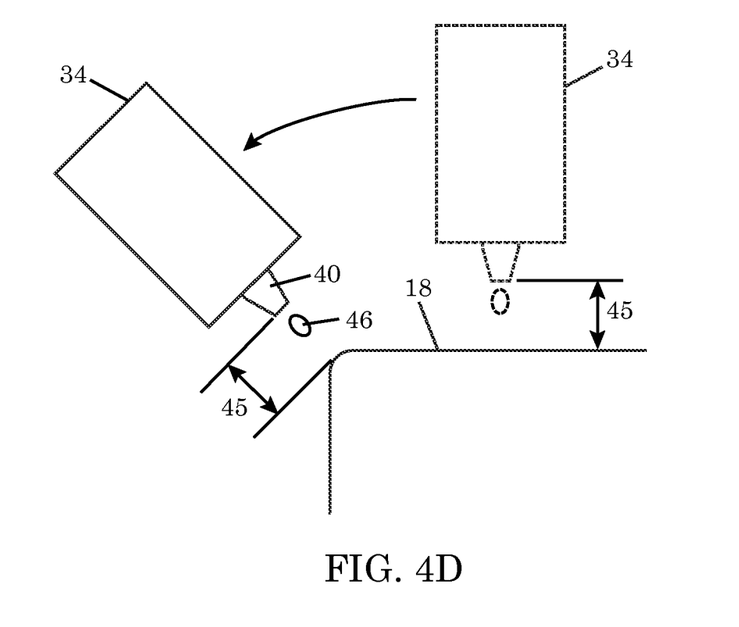
FIG. 4D shows a dispenser following a perimeter shape while jetting droplets.

The nozzle 40 is arranged in opposing relation to the perimeter edge 18 of the glass article 10, with a standoff distance 45 between the nozzle 40 and the perimeter edge 18. The standoff distance may be in a range from 0.5 mm to 7 mm, but is typically in a range from 0.5 mm to 1 mm. The droplets 46 of coating material jetted from the orifice of the nozzle 40 drop through the standoff distance 45 and fall on the perimeter edge 18 as beads 50 of coating material. The dispensing speed can be over 200 mm/s. Relative motion between the nozzle 40 and the perimeter edge 18 is provided as the dispenser 34 jets the droplets 46, resulting in the beads 50 being deposited at various locations along the perimeter edge 18. The relative motion can be provided by translating the dispenser 34 relative to the glass article 10 or by translating the glass article 10 relative to the dispenser 34 or by translating the dispenser 34 and glass article 10 relative to each other. The standoff distance 45 can be constant or may vary with the relative motion. The dispenser 34 may be translated along straight or linear paths while jetting droplets 46, even when the beads 50 are being deposited on non-straight portions of the perimeter edge, such as illustrated in FIGS. 4B and 4C. In the examples shown in FIGS. 4B and 4C, the standoff distance 45 may vary depending on the location of the nozzle 40 relative to the perimeter edge 18. Alternatively, the dispenser 34, or nozzle 40, may follow the contour of the perimeter edge 18, as illustrated in FIG. 4D, in which case the standoff distance 45 may be constant.

Figure 5A:
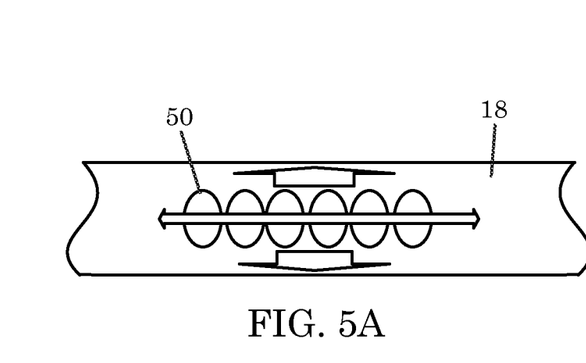
FIG. 5A shows non-overlapping beads on a perimeter edge.
Figure 5B:
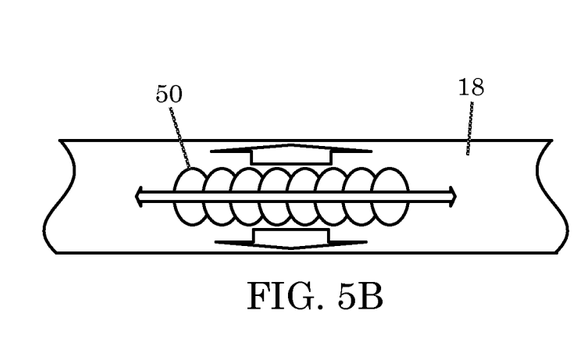
FIG. 5B shows overlapping beads on a perimeter edge.

After each bead 50 is deposited on the perimeter edge 18, the bead 50 will start to flow in all directions, coating a portion of the perimeter edge 18 in the process. FIGS. 5A and 5B show flow of beads 50 on the perimeter edge 18. The beads 50 are flowing towards the transitions between the perimeter edge 18 and the opposing glass surfaces and towards each other. The rate at which each bead 50 flows will depend on the viscosity of the coating material and the surface conditions of the perimeter edge 18. Eventually, the beads 50 will combine to form a continuous coating, e.g., 52 in FIG. 4A, along the perimeter edge 18. The smoothness and stability of the continuous coating will depend on the viscosity of the coating material and the surface conditions of the perimeter edge.

Figure 5C:
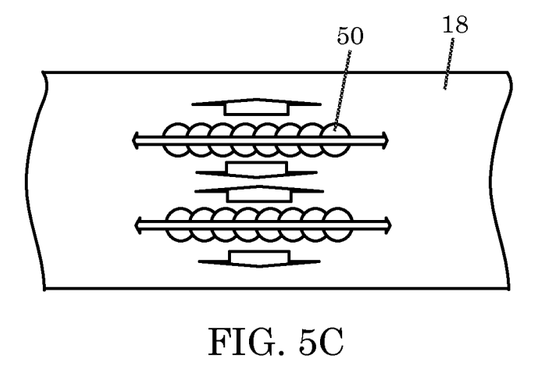
FIG. 5C shows beads deposited along two lines on a perimeter edge.

Beads can be deposited on the perimeter edge in a variety of ways. For example, FIGS. 5A and 5B show beads 50 deposited in a single line along the perimeter edge 18, while FIG. 5C shows beads 50 deposited in two lines along the perimeter edge 18. The flow direction of the beads 50 are indicated by arrows in FIGS. 5A-5B.

The beads 50 may be deposited such that they do not initially overlap, e.g., as shown in FIG. 5A, or may be deposited such that they initially overlap, e.g., as shown in FIGS. 5B and 5C. The overlapping beads 50 may have an advantage when it comes to smoothness of the continuous coating formed when the beads 50 eventually combine.

Figure 6A:
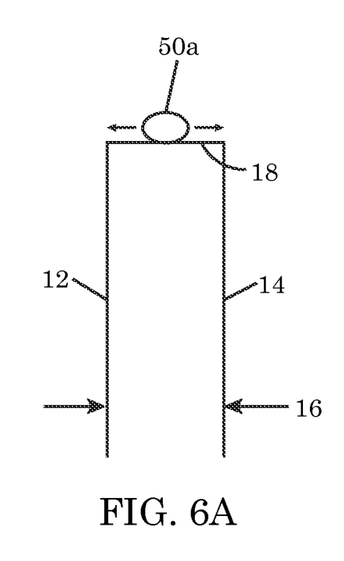
FIG. 6A shows a relatively small bead on a perimeter edge having a flat profile.
Figure 6B:
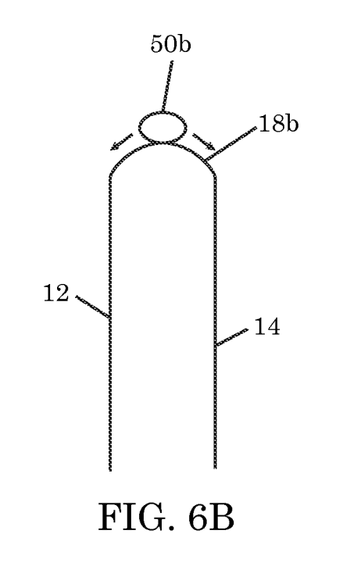
FIG. 6B shows a relatively small bead on a perimeter edge having a bull-nose profile.
Figure 6C:
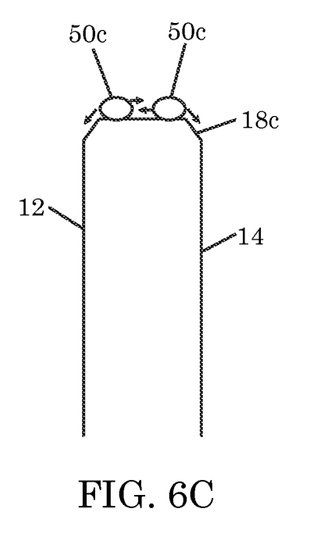
FIG. 6C shows relatively small beads on a perimeter edge having a chamfered profile.

Relatively small beads compared to the thickness of the glass article can be deposited on the perimeter edge. FIG. 6A shows a relatively small bead 50a on a perimeter edge 18 having a flat profile. FIG. 6B shows a relatively small bead 50b on a perimeter edge 18b having a bull-nosed profile. In FIGS. 6A and 6B, the small beads 50a, 50b will flow out to the transitions between the perimeter edges 18, 18a and the opposing surfaces 12, 14 of the glass article. FIG. 6C also shows relatively small beads 50c on a perimeter edge 18c having a chamfered profile. In this case, the beads 50c are deposited in two lines along the perimeter edge 18c, such as illustrated with beads 50c in FIG. 5C.

Figure 6D:
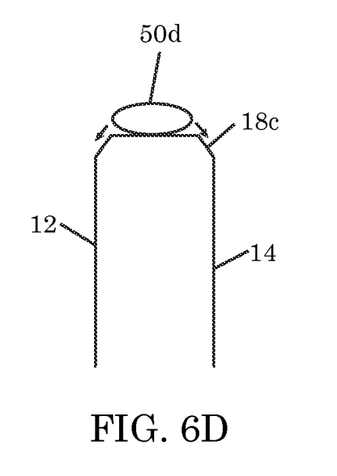
FIG. 6D shows a relatively large bead on a perimeter edge having a chamfered profile.

Relatively large beads compared to the thickness of the glass article can be deposited on the perimeter edge. FIG. 6D shows a relatively large bead 50d on a perimeter edge 18c having a chamfered profile. Compared to the relatively small beads described above, especially those deposited in a single line, the flow out time with the relatively large beads will be reduced. The flow out time is the time required for the bead flow to completely cover the perimeter edge as well as to smooth out the transition areas.

In general, the sizing and arrangement of beads can influence flow out time. Typically, the jetting of droplets is such that each of the beads is not larger than the thickness of the glass article when deposited on the perimeter edge. This will allow the beads room to flow out and coat the perimeter edge without overflowing onto the opposing surfaces of the glass article. For example, the size of each bead 50 (50a, 50b, 50c, 50d) of coating material may range from 20% to 95% of the thickness of the glass article 16 (see 16 in FIGS. 1B, 6A).

The dispenser 34 (in FIG. 4A) and glass article 10 (in FIG. 4A) may be arranged in a horizontal orientation or vertical orientation during the coating process. Since the capillary forces and surface tensions are more dominant factors than gravity, the coating material wets and covers the perimeter edge adequately in the horizontal orientation.

Figure 7:
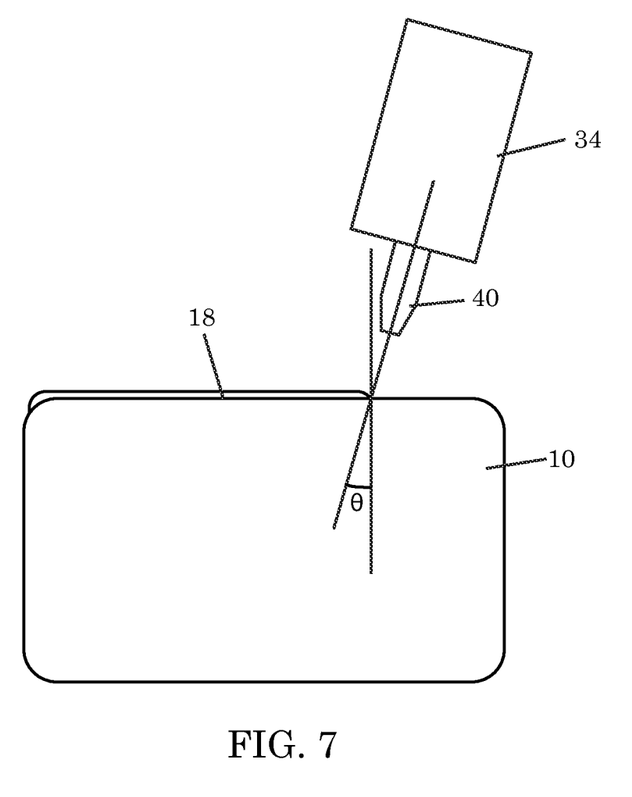
FIG. 7 shows angling of a jetting nozzle relative to a perimeter edge.

During a coating process, the dispenser 34 can be arranged such that the nozzle 40 is normal to a line segment of the perimeter edge 18, e.g., as shown in FIG. 4A. The dispenser 34 can also be arranged such that the nozzle 40 is at an angle relative to a normal to a line segment of the perimeter edge 18. For example, FIG. 7 shows the nozzle 40 at an angle $\theta$ to the normal to the perimeter edge 18. The angle $\theta$ may be in a range from 1° to 45°. Angling of the nozzle 40 relative to the normal may allow oval or more oval beads. The transition between overlapped oval beads tend to be smoother than the transition between overlapped circular beads. Thus oval beads may enable a more uniform coating compared to circular beads.

Various key parameters are involved in the coating process and can be controlled to achieve desired coating attributes. For example, the type of valve used in the dispenser can be selected based on the viscosity or other property of the coating material. The viscosity may be in a range from 500 to 10,000 cp, for example. The temperature of the valve can be controlled to maintain the coating material inside the dispenser at a constant temperature and at a relatively low viscosity that would facilitate flowing of the beads when deposited on the perimeter edge. The glass article can be maintained at a constant temperature that will match the temperature of the beads when deposited on the perimeter edge. This may help reduce thermal shock of the glass article or beads and facilitate flow of the beads.

Pulse time and cycle time of the valve are other parameters that can be controlled. The pulse time is the duration of the time the valve is opened and controls the volume of material jetted from the dispenser. The cycle time is the timing between each opening of the valve. The valve velocity or acceleration, which controls the dispensing speed, is another key parameter. The location of the start and stop of the jetting, also known as the knitting point, is another key parameter. The air pressure applied to the material delivery system, which is typically in the form a syringe, the standoff distance between the nozzle and the perimeter edge, the jetting angle, and the flow-out time are other key parameters. Air pressure controls the continuous delivery of the coating material to the valve as the valve pulses. At a higher temperature, more coating material would be delivered if other jetting parameters are held constant. However, more coating material can be jetted by increasing the pulse time, i.e., the time the valve is open, at a pressure setting. Thus air pressure is not the only parameter to control the amount of coating material delivered.

EXAMPLE 1

One example of parameter settings for a coating process is shown in Table 1. The values shown in Table 1 are examples only. Other values may be selected depending on the coating material used and the desired coating performance or quality.

TABLE 1

| Parameter | Value |
|---|---|
| Valve Type | PicoDot LV jet valve |
| Nozzle size | 150 μm |
| Valve Temperature | 50° C. |
| Pulse Time | 0.50 ms |
| Cycle Time | 1.70 ms |
| Valve velocity (or dispensing speed) | 322 mm/s |
| Air Pressure | 85 psi |
| Nozzle to Glass Gap (or standoff distance) | 3.5 mm |
| Viscosity | 500 to 3,500 cp |

While a limited number of embodiments have been described herein, those skilled in the art, having benefit of this disclosure, will appreciate that other embodiments can be devised which do not depart from the scope of the disclosure and appended claims. Accordingly, the scope of the disclosure should be limited only by the attached claims.

The invention claimed is:

1. A method of glass edge coating, comprising:
providing a glass article having opposing surfaces separated by a thickness of glass and bounded by a perimeter edge;
arranging a nozzle of a jetting dispenser in opposing relation to the perimeter edge of the glass article with a select standoff distance between the nozzle and the perimeter edge;
supplying a coating material to the jetting dispenser;
jetting a plurality of droplets from the nozzle of the jetting dispenser, wherein the droplets drop on the perimeter edge after falling through the standoff distance to form beads of coating material on the perimeter edge, whereafter each bead flows in a plurality of directions on the perimeter edge to form a coating on the perimeter edge that is substantially limited to the perimeter edge;
effecting a relative motion between the nozzle and the perimeter edge during the jetting such that the beads are deposited at a plurality of locations along the perimeter edge; and
maintaining a viscosity of the coating material in the jetting dispenser in a range from 500 to 10,000 cp during the jetting.

2. The method of claim 1, wherein the standoff distance is in a range from 0.5 mm to 7 mm during the jetting.

3. The method of claim 1, wherein the relative motion is effected such that the nozzle follows the perimeter edge of the glass article allowing for constancy in the standoff distance between the nozzle and the perimeter edge.

4. The method of claim 1, wherein the relative motion is effected such that the nozzle follows a linear path allowing for variations in the standoff distance between the nozzle and the perimeter edge.

5. The method of claim 1, wherein a viscosity of the coating material is selected such that the beads flow from the locations where they are deposited to transitions between the perimeter edge and opposing surfaces of the glass article.

6. The method of claim 1, wherein the beads flow and combine to form a continuous coating along the perimeter edge.

7. The method of claim 1, wherein the beads are deposited in a single line along the perimeter edge.

8. The method of claim 1, wherein the beads are deposited in multiple lines along the perimeter edge.

9. The method of claim 1, wherein each bead has a size smaller than a thickness of the glass article when deposited on the perimeter edge.

10. The method of claim 1, wherein the nozzle is aligned with a normal to the perimeter edge.

11. The method of claim 1, wherein the nozzle is angled relative to a normal to the perimeter edge such that each bead deposited on the perimeter edge while the nozzle is angled has an oval shape prior to the bead flowing.

12. The method of claim 1, wherein the coating material is a UV curable polymer, and further comprising curing the coating formed on the perimeter edge.

13. The method of claim 12, further comprising measuring a perimeter shape of the glass article prior to jetting the droplets to form the beads on the perimeter edge and after curing the coating on the perimeter edge and determining a uniformity of the thickness of the coating from a difference between the measured perimeter shapes.

14. The method of claim 13, further comprising adjusting one or more parameters controlling the jetting of the plurality of droplets based on the measurement of the perimeter shape for a subsequent coating of a perimeter edge of another glass article.

15. The method of claim 1, wherein the depositing is such that the coating formed on the perimeter edge has a thickness in a range between 25 μm and 100 μm.

16. The method of claim 1, wherein the coating material is optically matched to the material of the glass article such that the coating is non-apparent relative to the glass article.

17. The method of claim 1, wherein a dispensing speed of the jetting dispenser during the jetting is greater than 200 mm/s.

18. A method of glass edge coating, comprising:
providing a flat glass article having opposing surfaces separated by a thickness of glass and bounded by a perimeter edge, the thickness of the flat glass article being less than 1 mm;
arranging a nozzle of a jetting dispenser in opposing relation to the perimeter edge of the flat glass article with a select standoff distance between the nozzle and the perimeter edge;
supplying a coating material to the jetting dispenser;
jetting a plurality of droplets from the nozzle of the jetting dispenser, wherein the droplets drop on the perimeter edge after falling through the standoff distance to form beads of coating material each having a size smaller than the thickness of the flat glass article on the perimeter edge, whereafter each bead flows in a plurality of directions on the perimeter edge to form a coating on the perimeter edge that is substantially limited to the perimeter edge and having a thickness in a range from 25 µm and 100 µm;
effecting a relative motion between the nozzle and the perimeter edge during the jetting such that the beads are deposited at a plurality of locations along the perimeter edge; and
maintaining a viscosity of the coating material in the jetting dispenser in a range from 500 to 10,000 cp during the jetting.

* * * * *